June 6, 1961  G. M. KRAMER ET AL  2,987,563
PARAFFIN HYDROCARBON ISOMERIZATION
Filed Sept. 25, 1959
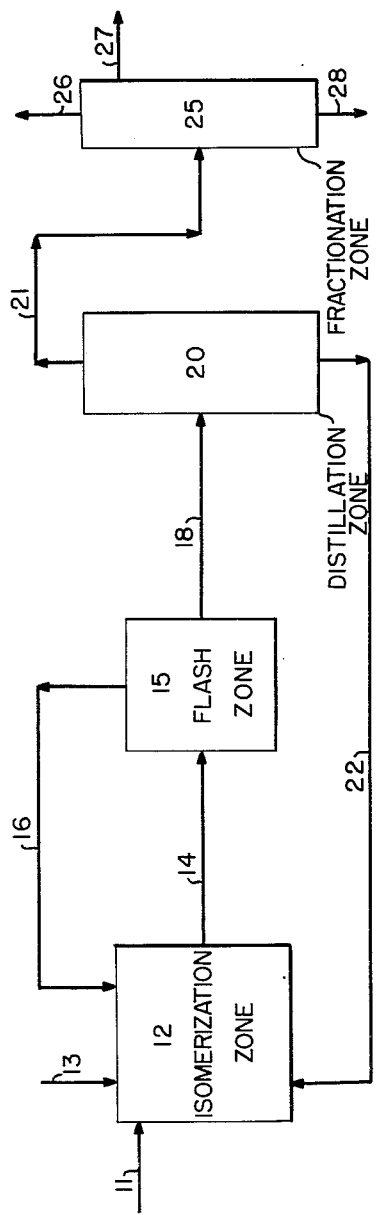
George M. Kramer
William Doering    Inventors
By *Byron O. Dimmich*
Patent Attorney

2,987,563
PARAFFIN HYDROCARBON ISOMERIZATION

George M. Kramer, Berkeley Heights, N.J., and William Doering, New Haven, Conn., assignors to Esso Research and Engineering Company, a corporation of Delaware
Filed Sept. 25, 1959, Ser. No. 842,436
5 Claims. (Cl. 260—683.76)

This invention concerns a process for isomerizing paraffin hydrocarbons or, in other words, for converting straight chain paraffin hydrocarbons into the more desirable branched chain isomers. In particular, the invention relates to a liquid phase paraffin hydrocarbon isomerization process utilizing aluminum halides as catalysts wherein more efficient contacting of the catalysts with the reacting hydrocarbons is achieved than has been possible in the isomerization processes heretofore employed.

The isomerization of straight chain or normal paraffin hydrocarbons of from 4 to 7 carbon atoms into the corresponding branched chain isomers is well known. This type of process is useful to the petroleum refiner because it furnishes a source of high octane components for aviation and automotive fuels. To effect the isomerization, it is convenient to employ as catalysts certain metal halides, particularly aluminum chloride or aluminum bromide, in conjunction with certain promoters, such as hydrogen fluoride, hydrogen chloride, hydrogen bromide, or boron fluoride. The aluminum halide catalyst is ordinarily associated with a suitable support, such as activated carbon, silica gel, calcined bauxite, or the like. In some isomerization processes, the aluminum halide is employed in the form of a complex with a hydrocarbon or with an alkyl halide, for example. Both the supported catalyst and the catalyst complex systems necessarily require that two separate phases be present in the reaction zone, i.e. the catalyst phase and the reacting hydrocarbon phase. With a heterogeneous system of this type, the efficiency of contact between the catalyst and the reacting hydrocarbons often leaves much to be desired. Hence, there is a need for a system wherein more efficient contacting of the catalyst with the reacting hydrocarbons can be obtained.

In accordance with the present invention, it has been found that in the isomerization of light petroleum naphtha fractions or of paraffinic hydrocarbons of from 4 to about 7 carbon atoms, a completely homogeneous system can be attained by adding a poly-halogenated benzene to aluminum bromide. While several of the halogenated benzenes will form such systems, not all of them are acceptable because many of them tend to decompose to benzene, which is undesirable because the latter material inhibits the isomerization reaction. Accordingly, the compounds employed in conjunction with aluminum bromide in the present invention are those selected from the group consisting of meta-dichlorobenzene, 1,2,3-trichlorobenzene, and 1,2,4-trichlorobenzene. The mole ratio of aluminum bromide to the halogenated benzene should be greater than 0.1 to 1 and no greater than about 1 to 1. Preferably, the system comprises one in which the said mole fraction is in the range of about 0.15 to 1 to about 0.4 to 1.

The reaction conditions for the isomerization reaction, in accordance with the present invention, will in general embrace the use of temperatures in the range of from about 40° to about 150° F., and pressures in the range of from about atmospheric to about 100 p.s.i.g. Ordinarily it is necessary to use only sufficient pressure to keep the reacting hydrocarbons in the liquid phase at the reacting temperature.

It is desirable that the hydrocarbon feed to the isomerization reaction contain no more than a maximum of about 0.1 percent of aromatic hydrocarbons. Although many naphthas contain benzene to the extent of from about 2 to about 6 volume percent, the aromatic hydrocarbon can be removed from the feed by any of the conventional methods which include solvent extraction, extractive distillation, hydrogenation, and acid treating. A particularly desirable method of removing aromatics is to contact the feed with an adsorbent, such as a molecular sieve zeolite of from 10 A. to 13 A. pore size.

Generally, naphthenic hydrocarbons do not have to be removed from the feed. Furthermore, their presence is often beneficial in suppressing cracking and sludge formation. Hence, it is within the contemplation of the invention to add naphthenes such as methylcyclohexane to the feed when necessary to reduce cracking and sludging.

No particular technique is required in preparing the catalyst system. Usually, the aluminum bromide and the polychlorobenzene may be simply mixed together. In the case of 1,2,3-trichlorobenzene it is desirable to raise the temperature above its melting point, which is about 125–126° F.

Promoters such as hydrogen halides, alkyl halides, and water may be used in conjunction with the catalysts. If water is used, the quantity generally should not exceed the saturation limits of the hydrocarbons involved, i.e., in the neighborhood of 40 to 50 p.p.m. If alkyl halides are used, they should not exceed about a 1 to 1 mole ratio based on the $AlBr_3$ in the catalyst composition. Ethyl bromide is particularly preferred. The alkyl halides may be prepared in situ by reaction of olefins with hydrogen halides. Hydrogen halides, such as HBr, may be used as promoters in concentrations of from 0.1 to 10 weight percent, based on the hydrocarbon.

The nature and objects of the present invention will be better understood when reference is made to the accompanying drawing in which the single figure illustrates schematically a suitable flow plan for conducting the process.

Referring to the drawing, a feed stream comprising the hydrocarbon or hydrocarbon mixture that is to be isomerized is conducted by means of line 11 into isomerization zone 12. The latter zone contains a quantity of the catalyst mixture of the invention comprising aluminum bromide and one or more of the halogenated aromatics mentioned. Reaction conditions within zone 12 are maintained to bring about the desired isomerization reaction. If the reaction is conducted in the presence of an added promoter such as hydrogen bromide, the latter may be introduced into the reaction zone by means of line 13. The feed is conducted through the reaction zone at rates of the order of 0.1 to 5.0 v./v./hr.

While the homogeneous system does ensure efficient contacting of catalyst and reactants, some agitation should, nevertheless, be provided for in the reaction zone. Any suitable mixing means may be used, such as stirrers, baffles for turbulent flow, pumping means giving high flow rates, etc.

The products of the reaction and the catalyst are removed from reaction zone 12 by means of line 14 and conducted to an initial separation zone or flash zone 15 wherein separation of the hydrogen halide promoter, if one is used, from the mixture may be effected. The removed material may be recirculated to the reaction zone by means of line 16. The mixture of catalyst and reaction products may then be conducted by means of line 18 into distillation zone 20.

Conditions are maintained in zone 20 to vaporize overhead through line 21 the products of the isomerization reaction, leaving behind as a bottoms fraction a mixture of aluminum bromide and halogenated benzene. The latter may be recirculated through the reacting zone by means of line 22.

To prevent cracking, a high boiling naphthene such as Decalin may be added to the product in distillation zone 20. The naphthene can later be separated from the catalyst by distillation, or if its concentration is not too high, it may be recycled to the reaction zone with the catalyst.

The overhead vapors in line 21 are conducted into fractionation zone 25 wherein separation may be effected between the desired isomers and unconverted material, the separate cuts being taken overhead through line 26, through one or more sidestreams 27 and as bottoms through line 28. The unconverted normal hydrocarbons may be recirculated through the reaction zone.

As an alternative to the separation step involving distillation to recover the aluminum bromide and halogenated benzene, a separation may be effected by freezing. When the temperature of the resulting frozen material is raised, the hydrocarbons will liquefy first and may be separated from the catalyst mixture. For best results when using this technique it is advisable to employ multistage freezing and warming facilities.

The following examples illustrate the benefits obtained from employing the catalyst mixtures of the present invention and also illustrate the criticality of employing the particular halogenated benzenes of the present invention in preference to related halogenated benzenes.

EXAMPLE 1

Portions of normal hexane were contacted with different mixtures of 1,2,4-trichlorobenzene and aluminum bromide in separate reactions at temperatures in the range of from 100° to 150° F. for periods of 4 hours each. At the end of the reaction period, in each case, the product was separated from the catalyst mixture by distillation under vacuum, and the reaction products were analyzed. The various catalyst mixtures tried, the reaction temperatures used, and the results obtained in each case are presented in Table I. It will be seen from the data that the 1,2,4-trichlorobenzene promoted an isomerization activity of the aluminum bromide when the mole ratios of aluminum bromide to trichlorobenzene in the catalyst mixture were 0.2 to 1 and 0.4 to 1. When the mole fraction was 0.1 to 1, the activity was no better than aluminum bromide alone. Related tests have established that above a mole ratio of about 1 to 1 ($AlBr_3$ to trichlorobenzene) the isomerization activity is undesirably low.

Table I

| Run | A | B | C | D | E |
|---|---|---|---|---|---|
| 1,2,4-TCB, cc | 50 | 50 | 50 | 50 | 0 |
| $AlBr_3$, g | 53.4 | 53.4 | 26.7 | 13.4 | 26.7 |
| n-Hexane, cc | 50 | 50 | 50 | 50 | 50 |
| Temp. °F | 100 | 125 | 150 | 150 | 150 |
| Product Composition, Weight Percent: | | | | | |
| iso and normal $C_4$ and $C_5$ | 0.6 | 9.5 | 3.8 | 0.2 | 3.5 |
| iso-$C_6$ | 43.0 | 79.0 | 42.5 | 17.1 | 11.5 |
| n-$C_6$ | 55.6 | 7.6 | 52.7 | 82.5 | 81.5 |
| Benzene | 0.4 | 0 | 0 | 0 | 0 |
| $C_7$ and higher | 0.4 | 3.9 | 1.0 | 0.2 | 2.5 |
| Mole Ratio $AlBr_3$ to TCB | 0.4 | 0.4 | 0.2 | 0.1 | |

EXAMPLE 2

In a manner similar to that employed for Example 1, 1,2,3-trichlorobenzene and 1,3,5-trichlorobenzene were compared in conjunction with aluminum bromide as catalysts for the isomerization of normal hexane. A reaction temperature of 150° F. was used. The results obtained are shown in Table II. It will be seen that while 1,2,3-trichlorobenzene was satisfactory 1,3,5-trichlorobenzene was not. When the latter compound was used, there was excessive cracking of the hexane to $C_4$ and $C_5$ hydrocarbons and there was considerable decomposition of the trichlorobenzene to benzene, which is undesirable.

Table II
TEMPERATURE—150° F.

| Run | F | G |
|---|---|---|
| 1,2,3-TCB, cc | 36.1 | |
| 1,3,5-TCB | | 36.1 |
| $AlBr_3$, g | 13.4 | 13.4 |
| n-Hexane, cc | 25 | 25 |
| Product Composition, Weight Percent: | | |
| normal and iso $C_4$ and $C_5$ | 3.8 | 19.5 |
| iso-$C_6$ | 80.3 | 19.0 |
| n-$C_6$ | 8.7 | 42.2 |
| Benzene | 0 | 5.3 |
| $C_7$ and higher | 7.2 | 14.0 |
| Mole Ratio $AlBr_3$ to TCB | 0.25 | 0.25 |

EXAMPLE 3

In the same manner as in the previous examples, ortho, para, and meta-dichlorobenzenes were compared as catalyst adjuncts for aluminum bromide in the isomerization of normal hexane. In each case, the catalyst mixture was in the proportion of 25 cc. of the dichlorobenzene to 13.4 grams of aluminum bromide and the catalyst mixture was employed to isomerize 25 cc. of normal hexane. As in the previous examples, reaction periods of 4 hours were used. The results obtained are shown in Table III. Essentially no isomerization was obtained in the case of ortho-dichlorobenzene, while with para-dichlorobenzene undesirable production of benzene occurred. Meta-dichlorobenzene was found to be satisfactory.

Table III

| Run | H | J | K |
|---|---|---|---|
| Dichlorobenzene used | Ortho | Para | Meta |
| Temperature | 150° F. | 150° F. | 100° F. |
| Product Composition, Weight Percent: | | | |
| iso and normal $C_4$ and $C_5$ | 0 | 0 | 0 |
| iso-$C_6$ | 3.5 | 1.4 | 48.5 |
| n-$C_6$ | 96.5 | 91.2 | 51.2 |
| Benzene | 0 | 4.2 | 0 |
| $C_7$ and Higher | 0 | 3.2 | 0.3 |
| Mole Ratio $AlBr_3$ to Dichlorobenzene | 0.22 | 0.2 | 0.22 |

It is not intended that the specific examples herein presented should limit the scope of the invention in any manner. The scope is to be determined by the appended claims.

What is claimed is:

1. A process for isomerizing a paraffin hydrocarbon of from 4 to 7 carbon atoms which comprises contacting said hydrocarbon at a temperature in the range of from about 40° to about 150° F. with a catalyst comprising aluminum bromide and a halogenated benzene selected from the class consisting of m-dichlorobenzene, 1,2,3-trichlorobenzene, and 1,2,4-trichlorobenzene, said aluminum bromide being present in such concentration that the mole ratio of aluminum bromide to halogenated benzene is greater than 0.1 to 1 but not greater than about 1 to 1.

2. Process as defined by claim 1 wherein said mole ratio is within the limits of 0.15 to 1 and 0.4 to 1.

3. Process as defined by claim 1 wherein said catalyst is promoted by the presence of water.

4. Process as defined by claim 1 wherein said catalyst is promoted by the presence of a hydrogen halide.

5. Process as defined by claim 1 wherein said catalyst is promoted by the presence of an alkyl halide.

References Cited in the file of this patent
UNITED STATES PATENTS

| 2,410,894 | Montgomery | Nov. 12, 1946 |
| 2,427,775 | Friedman | Sept. 23, 1947 |